United States Patent
Biedermann

(10) Patent No.: US 6,904,299 B1
(45) Date of Patent: Jun. 7, 2005

(54) MOBILE TELECOMMUNICATIONS TERMINAL

(75) Inventor: Rolf Biedermann, Ahaus (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/937,539
(22) PCT Filed: Mar. 21, 2000
(86) PCT No.: PCT/DE00/00877
§ 371 (c)(1),
(2), (4) Date: Dec. 26, 2001
(87) PCT Pub. No.: WO00/59183
PCT Pub. Date: Oct. 5, 2000

(30) Foreign Application Priority Data

Mar. 26, 1999 (DE) .......................... 199 13 884

(51) Int. Cl.⁷ ................................. H04Q 7/22
(52) U.S. Cl. ................ 455/561; 455/564; 455/517
(58) Field of Search ..................... 455/564, 561, 455/566, 556.1, 552.1, 422.1, 426.1, 507, 517

(56) References Cited

U.S. PATENT DOCUMENTS

| | | | | |
|---|---|---|---|---|
| 5,613,213 A | * | 3/1997 | Naddell et al. | 455/435.2 |
| 5,745,855 A | * | 4/1998 | Futamura | 455/517 |
| 5,802,477 A | * | 9/1998 | Mizokami et al. | 455/435.2 |
| 6,094,576 A | * | 7/2000 | Hakkinen et al. | 455/422.1 |

FOREIGN PATENT DOCUMENTS

| | | | | |
|---|---|---|---|---|
| EP | 0 777 399 | * | 4/1997 | H04Q/7/32 |
| EP | 0 777 399 | | 6/1997 | |
| EP | 0 874 529 | * | 10/1998 | H04Q/7/22 |
| WO | WO 98/23108 | | 5/1998 | |
| WO | WO 98/27778 | * | 6/1998 | H04Q/7/38 |

* cited by examiner

*Primary Examiner*—William Trost
*Assistant Examiner*—Brandon J. Miller
(74) *Attorney, Agent, or Firm*—Bell Boyd & Lloyd LLC

(57) ABSTRACT

In the case a mobile telecommunications terminal which can be activated at different base stations (a, b, c, d) it is possible to store in a numbers memory (3) with respect to a call number (column 8) information (column 10) which indicates in connection with which of the base stations the call number can be dialed, and display means display only those names among the ones assigned to the call numbers which can be dialed in connection with a designated base station. This base station can be designated manually or automatically by a data exchange with the base station concerned.

9 Claims, 2 Drawing Sheets

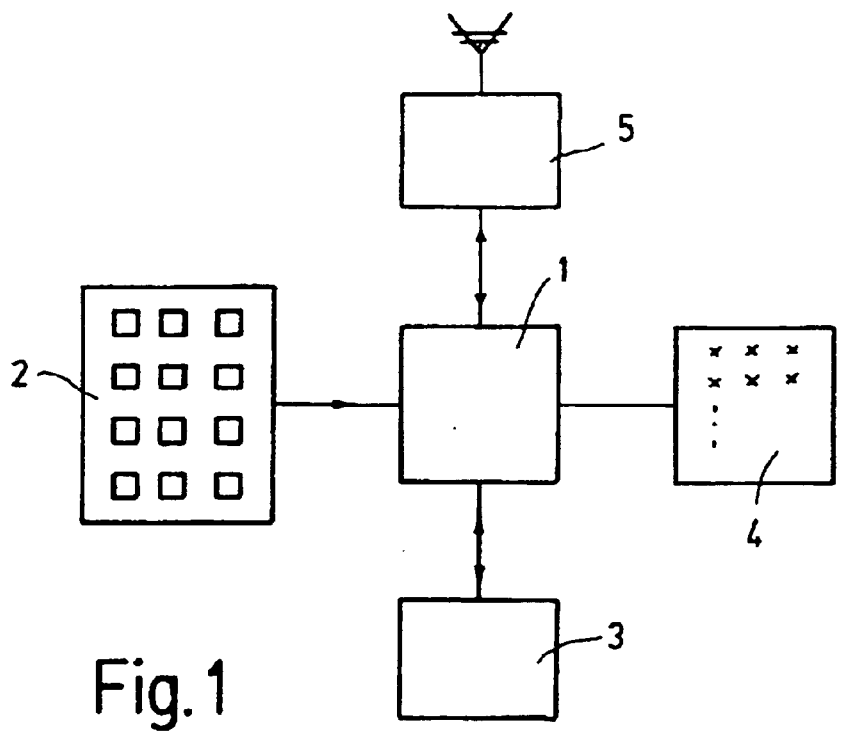

MOBILE TELECOMMUNICATIONS TERMINAL

Figure 3A:
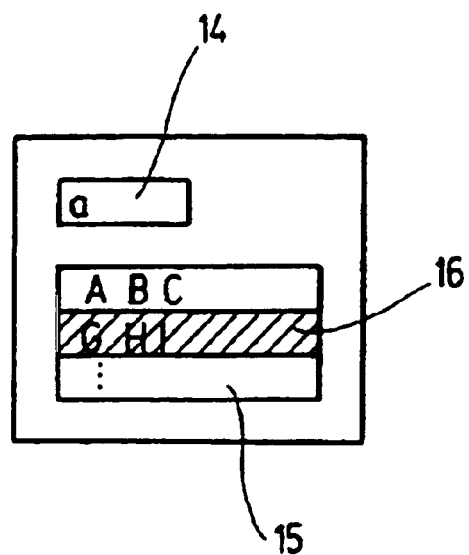

The present invention relates to a mobile telecommunications terminal which can be activated at in each case one of a number of different base stations in order to set up and conduct communication connections with a telecommunications network via this base station. Terminals of this type, in particular cordless telephones, can be used by a user indiscriminately in connection with base stations installed at different locations for telephoning, for example at one or more locations of a company where the user is employed or at his home. Cordless telephones of this type usually have a numbers memory, in which the user can store frequently used call numbers, if appropriate in conjunction with the name of a person to be called and with respect to which he can set up a connection by simply selecting the number or the name in a displayed list.

If such a mobile terminal is used in connection with different base stations, there may arise the problem that the numbering plans of these different base stations vary. If, for example, the base stations belong to different local networks, call numbers stored without a local area code can in each case only be dialed via the base station located in the relevant local network. Further problems may arise if an exchange identification code has to be preselected for one of the base stations but not for another, if abbreviated dialing numbers are used but are in each case only defined locally for one base station, or if extension numbers which are likewise in each case only meaningful for one base station are stored.

This obliges the users of such terminals to store in the numbers directory different numbers for the same persons to be called, whether they can be dialed depending on at which of the different mobile base stations the terminal is activated at a given point in time, and, whenever they dial a number from the numbers directory, always obliges them to remember at which base station the terminal is activated at the time concerned. This makes use of the numbers directory difficult and prone to errors.

EP 0 874 529 A2 discloses a mobile communications terminal which, on entering a radio service area and registration in this radio service area receives the area and local codes and address information identifying the position of the radio service area from the device providing the radio service, whereupon the mobile terminal determines on the basis of this information from its own address book the telephone numbers, names and addresses which are assigned to this radio service area, the addresses determined in this way being offered to the user on a display of the mobile terminal.

The present invention provides a telecommunications terminal which makes the numbers memory more convenient and reliable to use. For this purpose, it is provided in the case of a mobile telecommunications terminal which can be activated at in each case one of a number of different base stations in order to set up and conduct communication connections with a telecommunications network via this base station, and which has a numbers memory, means for displaying names assigned to call numbers stored in the numbers memory and means for transferring a call number to a base station in response to the selection by a user of the displayed name assigned to the call number, that it is possible to store with respect to a call number stored in the numbers memory information which indicates inconnection with which of the base stations the call number can be dialed. To be certain of ruling out operating errors by the user, the means for display are preferably set up to display only those names among the ones assigned to the stored call numbers which can be dialed in connection with a designated base station.

This ensures that, when using the call numbers memory for dialing a subscriber, a user is only offered for selection those names of subscribers for which a call number valid for the designated base station is stored.

This information may be displayed in various ways; for example, in a numbers memory organized on the basis of columns there may be provided a numbers column for the stored call numbers and a stations column specifying for each call number the base station(s) in connection with which this call number can be dialed. The information may, however, also be represented by the distribution of the stored call numbers in the numbers memory, to be specific if, in the case of a numbers memory organized on the basis of columns, each of the different base stations to which the terminal can be connected is assigned a column and in each column the call numbers which can be dialed in connection with the assigned base station are stored.

During normal use of the terminal, the designated base station should be the one at which the terminal is activated. This may be achieved in various ways.

One way is to equip such a terminal with an operator control element for the user to designate the base station. This allows the latter for example to make the base station of his workplace the designated base station when he arrives at work in the morning, when he gets home on the other hand the base station of his home. This rules out the possibility of him inadvertently dialing at his workplace call numbers from the numbers directory which are only valid at home, and vice versa.

If a mobile terminal is activated at a base station, that is to say enters a state of readiness in which it is capable of receiving it for certain calls from the base station or of sending requests for establishing a call connection to said station, there must necessarily first take place a data exchange between the base station and the terminal in which both reveal their identity to the other, in order in this way to check the authorization to communicate with each other. If the terminal in this way establishes the identity of the base station at which it is activated, it is advantageous if it makes this base station the designated base station. In this case, it is not necessary for the user to designate the base station because this is automatically performed by the terminal when it enters the transmitting/receiving range of a base station or is switched on within this range.

The terminal is, furthermore, advantageously able to be switched over between a dialing operating state, in which only the names which can be dialed in connection with the designated base station are displayed and offered to a user for selection, and an editing operating state, in which all the data, names, call numbers and information on the assignment of a call number to a station stored in the numbers memory are displayed and can be changed by a user.

When a user enters a call number into the numbers memory of the terminal, he has the possibility of specifying in connection with which of the different base stations the call number is to be able to be dialed. If he does not specify anything in this respect, the information that the number can be dialed in connection with all the base stations is stored with respect to the call number concerned. A user who uses the terminal only in connection with a single base station or in connection with a number of base stations which use the same numbering plans therefore does not have to do anything more than in the case of conventional terminals when entering call numbers into the numbers memory.

Figure 3B:
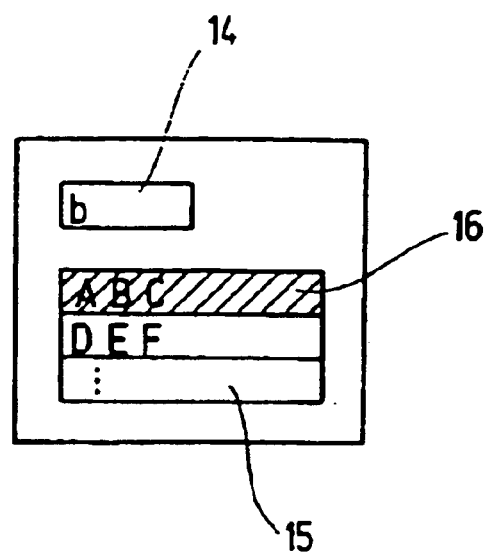

Further features and advantages of the invention emerge from the following description of exemplary embodiments with reference to the figures, in which:

FIG. 1 shows the individual functional groups of a terminal according to the invention, FIGS. 2A and 2B show two alternatives of the internal organization of a numbers memory, and FIGS. 3A and 3B show possible forms of a display element of the terminal in the dialing operating state.

FIG. 1 schematically shows the functional groups of a mobile telecommunications terminal which are important for understanding the present invention. These are a processor 1, which receives inputs of a user via an operator control element in the form of a keypad 2, a numbers memory 3, to which the processor 1 has reading and writing access, a display element, for example in the form of an LCD display 4, and a transmitter/receiver functional group 5 for the exchange of signaling data between the processor 1 and a base station (not represented), for example for transmitting a call number selected by the user from the processor to the base station, and for transferring user information during the existence of a call connection.

FIG. 2A shows a first example of the internal organization of the numbers memory 3. In the case considered here, the terminal can be connected to up to four different base stations, and the numbers memory 3 accordingly comprises four numbers columns 8, each of which is respectively assigned to one of the base stations (a, b, c or d). A names column 9 is shared by all the numbers columns 8. One row of the numbers memory 3 contains in the names column 9 a name of a subscriber. The numbers columns 8 respectively contain in the same row call numbers of the subscriber concerned which are valid for the base station assigned to the numbers column. For the further description it is to be assumed as an example that the base station a corresponding to the first numbers column 8 is a base station at the workplace of the user, and the station b corresponding to the second numbers column is a base station at the user's home.

Each stored subscriber respectively has a corresponding row of the numbers memory 3. Stored in the first row are the name "ABC" of a first subscriber and, in the numbers columns 8 corresponding to the base stations a and b, the call numbers valid for the corresponding base stations. "ABC" could be, for example, a superior of the user who can be reached via the company's base station by an abbreviated dialing number "73" and an extension number "2318" and via the private base station b by using a local network code. The subscriber "DEF" stored in the second row may be, for example, a personal friend of the user and can only be reached via a stored call number from the private base station b. A third subscriber "GHI", for example a colleague of the user, is assigned only a call number valid at the company base station a, which is for example an extension number of an in-house telecommunications system. Since, in the example considered here, the terminal is used only in connection with the two base stations a and b, the third and fourth numbers columns 8 remain unoccupied. Similarly, memory locations in the numbers columns 8 corresponding to the base stations a and b remain unoccupied if no call number is stored for a subscriber in connection with the corresponding base station.

An organization of the numbers memory 3 avoiding the leaving empty of individual memory locations is shown in FIG. 2B. Here, the numbers memory 3 is divided into a names column 9, a single numbers column 8 and a stations column 10. Thus, for example, the first row of the numbers memory 3 contains in the names column the name "ABC", in the numbers column 8 the company call number of "ABC" and in the stations column a set bit with respect to each base station for which the number is valid and a reset bit for all the other base stations. In the present case, only the bit corresponding to the company base station a is set; if the call number were valid for a number of base stations, all the bits corresponding to the stations would be set. The second row in turn contains the name "ABC", the call number valid for the private base station b and, in the stations column 10, a set bit corresponding to the station b.

If the terminal enters the transmitting/receiving range of a base station or is put into operation in this range, it is first necessary to designate this base station. In a simple configuration of the terminal, the user can do this manually, for example by pressing on the keypad 2 a key assigned to the base station to be designated. If the user later activates a dialing operating state of the terminal, the processor 1 reads the content of the call number memory 3 and displays on the display 4 only those names to which a call number valid for the designated base station is assigned in the numbers memory 3, so that the user can also only dial these numbers.

FIG. 3A shows the form of the display 4 when the terminal a is designated. A first display zone 14 of the display 4 indicates which is the currently designated station; in a second display zone 15, the names of the persons to be called who can be dialed are shown. In this case, the name of one of the persons to be called which can be chosen by pressing a selection key of the operator control panel 2 is identified in a known way by a dark background 16, inverted script or bold representation of the letters. In the case of FIG. 3A, in which the base station a is designated and displayed in the display zone 14, the processor 1 selects the names "ABC" and "GHI" for display; the subscriber "DEF", likewise stored in the numbers memory 3, is not displayed since his call number is not valid for the station a. By analogy, in the case shown in FIG. 3B where the base station b is designated, only the names "ABC" and "DEF" are displayed; the subscriber "GHI" cannot be selected.

In a more advanced configuration of the terminal, the processor 1 automatically performs the designation of the base station. For this purpose it is sufficient to evaluate the legitimation record usually made when a terminal is activated at a base station and in which the base station reveals its identity to the terminal. In this way, a fully automatic change between different base stations is possible, and the use of the correct call numbers is ensured at each base station, even without the user having to know in the transmitting/receiving range of which base station the terminal is located.

The input of call numbers and names into the numbers memory 3 takes place in a known way. Following the input, the processor 1 provides the user with the choice via the display 4 of whether he would like to specify base stations for which the call number entered is valid. If the user answers no by pressing a corresponding key of the keypad 2, the entered call number is regarded as valid for all the base stations, that is to say in the case of an organization of the numbers memory such as that shown in FIG. 2A, the number is entered identically into all the numbers columns 8; in the case of the organization represented in FIG. 2B, all the bits of the stations column 10 for the number concerned are set. For a user who does not require the capability of the terminal to activate itself for different base stations, the input of data into the numbers memory therefore does not involve any more effort than in the case of a terminal which does not have this capability.

If the user answers yes, he is subsequently requested by the processor 1 to press one or more keys of the keypad 2 which are respectively assigned to a base station, and subsequently to press a confirmation key, to specify in this way one or more base stations for which the number is valid.

It goes without saying that the present invention can be used irrespective of the type of base station at which the terminal can be activated. For example, one or more of these base stations may be ones which have been set up by a private operator for his own use, for example within a home or company, whereas other base stations at which the terminal can likewise be activated may belong for example to one or even various different public mobile telephone networks.

What is claimed is:

1. A mobile telecommunications terminal which can be activated at one of a plurality of different base stations to set up and conduct communication connections with a telecommunications network via a respectively designated base station, the terminal comprising:

a numbers memory for storing call numbers as well as information which indicates with which of the plurality of base stations each respective call number can be dialed, wherein the information assists a user in determining which of the plurality of different base stations should be selected as the designated base station;

a display for displaying names assigned to call numbers stored in the numbers memory, as well as for displaying the respectively associated call numbers and information; and a part for transferring a call number to a base station in response to a selection by a user of a displayed name assigned to the call number, the base station thus serving as the designated base station.

2. A mobile telecommunications terminal as claimed in claim 1, wherein the display only displays the names among the names assigned to the stored call numbers which can be dialed with the designated base station.

3. A mobile telecommunications terminal as claimed in claim 1, wherein the numbers memory includes a plurality of columns, a numbers column containing the stored call numbers and a stations column specifying for each call number the base stations with which the call number can be dialed.

4. A mobile telecommunications terminal as claimed in claim 1, wherein the numbers memory includes a plurality of columns which are respectively assigned to a base station, such that the call numbers which can be dialed with the respective base station are respectively stored in each column.

5. A mobile telecommunications terminal as claimed in claim 1, further comprising:

an operator control element for the user to designate a base station.

6. A mobile telecommunications terminal as claimed in claim 1, wherein the terminal is set up to establish an identity of the base station at which the terminal is activated and to make the base station the designated base station.

7. A mobile telecommunications terminal as claimed in claim 1, further comprising:

an operator control element for switching the display between a dialing operating state, in which only the names which can be dialed with the designated base station are displayed, and an editing operating state, in which all data stored in the numbers memory are displayed.

8. A mobile telecommunications terminal as claimed in claim 1, wherein, unless otherwise specified by the user, the terminal stores with respect to a call number entered by the user into the numbers memory information that the number can be dialed with all of the base stations.

9. A mobile telecommunications terminal as claimed in claim 1, wherein the terminal is a cordless telephone.

* * * * *